United States Patent [19]

Webb, Jr. et al.

[11] Patent Number: 5,019,965

[45] Date of Patent: May 28, 1991

[54] METHOD AND APPARATUS FOR INCREASING THE DATA STORAGE RATE OF A COMPUTER SYSTEM HAVING A PREDEFINED DATA PATH WIDTH

[75] Inventors: David A. Webb, Jr., Berlin; Ricky C. Hetherington, Northboro; Ronald M. Salett, Framingham; Trvggve Fossum, Northboro; Dwight P. Manley, Holliston, all of Mass.

[73] Assignee: Digital Equipment Corporation, Maynard, Mass.

[21] Appl. No.: 306,826

[22] Filed: Feb. 3, 1989

[51] Int. Cl.$^5$ .................................................. G06F 13/00
[52] U.S. Cl. .................................. 364/200; 364/239.3; 364/243.41; 364/246.7; 364/254.3
[58] Field of Search ................................ 364/200, 900

[56] References Cited

U.S. PATENT DOCUMENTS

| | | |
|---|---|---|
| 3,949,379 | 4/1976 | Ball .................................. 364/200 |
| 4,317,168 | 2/1982 | Messina et al. ..................... 364/200 |
| 4,392,200 | 6/1983 | Arulpragasam ..................... 364/200 |
| 4,395,758 | 6/1983 | Helenius et al. .................... 364/200 |
| 4,454,578 | 6/1984 | Matsumoto et al. ................. 364/200 |
| 4,500,958 | 2/1985 | Manton et al. ..................... 364/200 |
| 4,509,116 | 4/1985 | Lackey et al. ...................... 364/200 |
| 4,736,293 | 4/1988 | Patrick .............................. 364/200 |
| 4,742,446 | 5/1988 | Morioka et al. .................... 364/200 |
| 4,860,192 | 8/1989 | Sachs et al. ........................ 364/200 |

OTHER PUBLICATIONS

Fossum et al., "An Overview of the VAX 8600 System," Digital Technical Journal, No. 1, Aug. 1985, pp. 8–23.

Troiani et al., "The VAX 8600 I Box, A Pipelined Implementation of the VAX Architecture," Digital Technical Journal, No. 1, Aug. 1985, pp. 24–42.

Fossum et al., "The F Box, Floating Point in the Vax 8600 System," Digital Technical Journal, No. 1, Aug. 1985, pp. 43–53.

Primary Examiner—Gareth D. Shaw
Assistant Examiner—Matthew C. Fagan
Attorney, Agent, or Firm—Arnold, White & Durkee

[57] ABSTRACT

In a computer system, the flow of data from the execution unit to the cache 28 is enhanced by pairing individual, sequential longword write operations into a simultaneous quadword write operation. Primary and secondary writebuffers 50, 52 sequentially receive the individual longwords during first and second clock cycles and simultaneously present the individual longwords over a quadword wide bus to the cache 28. During the first clock cycle, when the cache 28 is not performing the quadword write operation, the cache 28 is free to perform the requisite lookup routine on the address of the first longword of data to determine if the quadword of address space is available in the cache. Thus, the flow of data to the cache 28 is maximized.

10 Claims, 5 Drawing Sheets

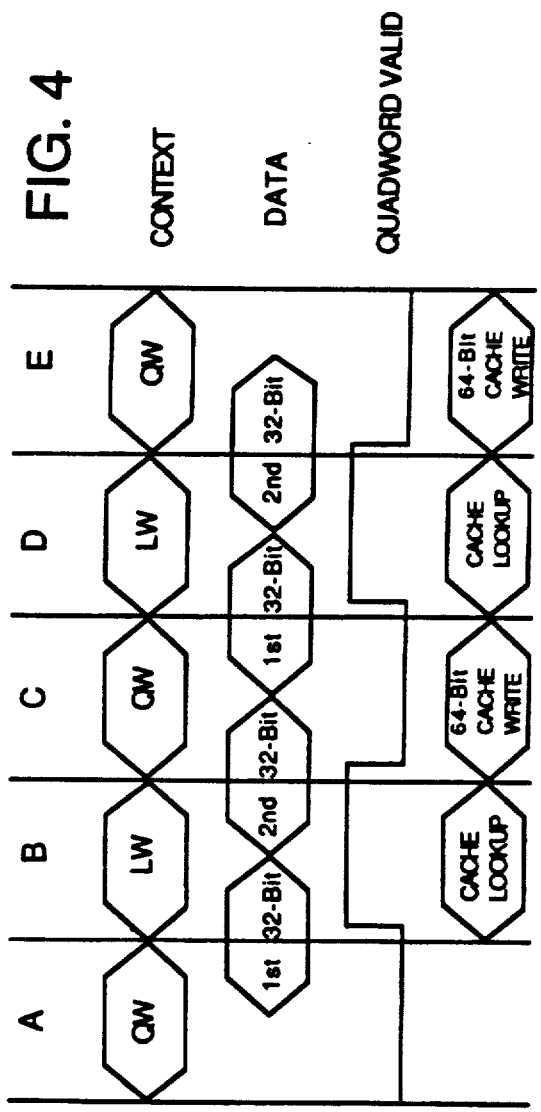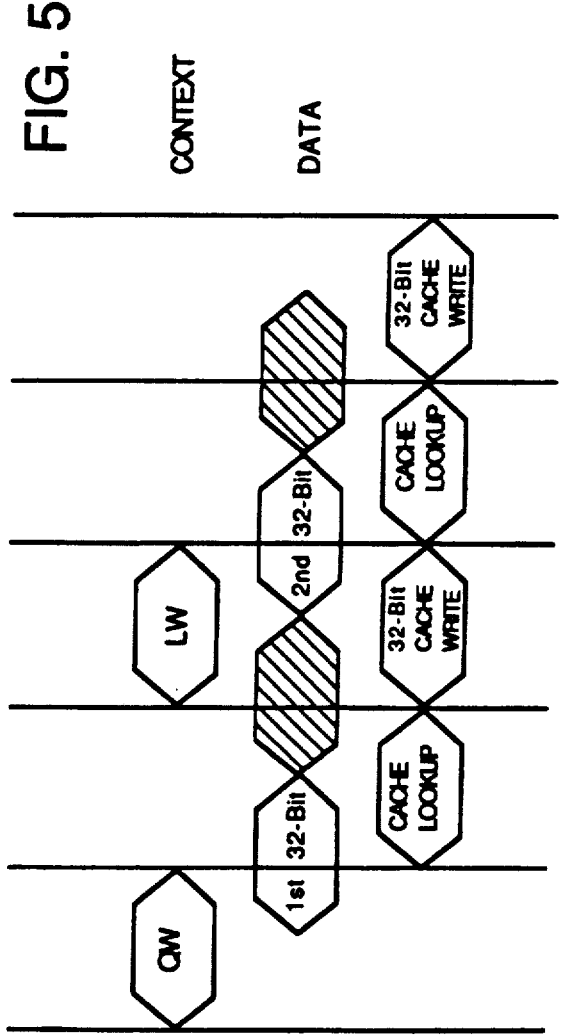

METHOD AND APPARATUS FOR INCREASING THE DATA STORAGE RATE OF A COMPUTER SYSTEM HAVING A PREDEFINED DATA PATH WIDTH

RELATED APPLICATIONS

The present application discloses certain aspects of a computing system that is further described in the following U.S. patent applications filed concurrently with the present application: Evans et al., AN INTERFACE BETWEEN A SYSTEM CONTROL UNIT AND A SERVICE PROCESSING UNIT OF A DIGITAL COMPUTER, Ser. Nos. 07/306,325 filed Feb. 3, 1989; Arnold et al., METHOD AND APPARATUS FOR INTERFACING A SYSTEM CONTROL UNIT FOR A MULTIPROCESSOR SYSTEM WITH THE CENTRAL PROCESSING UNITS, 07/306,837 filed Feb. 3, 1989; Gagliardo et al., METHOD AND MEANS FOR INTERFACING A SYSTEM CONTROL UNIT FOR A MULTI-PROCESSOR SYSTEM WITH THE SYSTEM MAIN MEMORY, 07/306,326 filed Feb. 3, 1989; D. Fite et al., DECODING MULTIPLE SPECIFIERS IN A VARIABLE LENGTH INSTRUCTION ARCHITECTURE, 07/306,347 filed Feb. 3, 1989; D. Fite et al., VIRTUAL INSTRUCTION CACHE REFILL ALGORITHM, 07/306,831 filed Feb. 3, 1989; Murray et al., PIPELINE PROCESSING OF REGISTER AND REGISTER MODIFYING SPECIFIERS WITHIN THE SAME INSTRUCTION, 07/306,833 filed Feb. 3, 1989; Murray et al., MULTIPLE INSTRUCTION PREPROCESSING SYSTEM WITH DATA DEPENDENCY RESOLUTION FOR DIGITAL COMPUTERS, 07/306,773 filed Feb. 3, 1989; Murray et al., PREPROCESSING IMPLIED SPECIFIERS IN A PIPELINED PROCESSOR, 07/306,846 filed Feb. 3, 1989; D. Fite et al., METHOD OF BRANCH PREDICTION, 07/306,760 filed Feb. 3, 1989; Fossum et al., PIPELINED FLOATING POINT ADDER FOR DIGITAL COMPUTER, 07/306,343 filed Feb. 3, 1989; Grundmann et al., SELF TIMED REGISTER FILE, 07/306,445 filed Feb. 3, 1989; Beaven et al., METHOD AND APPARATUS FOR DETECTING AND CORRECTING ERRORS IN A PIPELINED COMPUTER SYSTEM, 07/306,828 filed Feb. 3, 1989; Flynn et al., METHOD AND MEANS FOR ARBITRATING COMMUNICATION REQUESTS USING A SYSTEM CONTROL UNIT IN A MULTI-PROCESSOR SYSTEM, 07/306,871 filed Feb. 3, 1989; E. Fite et al., CONTROL OF MULTIPLE FUNCTION UNITS WITH PARALLEL OPERATION IN A MICROCODED EXECUTION UNIT, 07/306,832 filed Feb. 3, 1989; Webb, Jr. et al., PROCESSING OF MEMORY ACCESS EXCEPTIONS WITH PRE-FETCHED INSTRUCTIONS WITHIN THE INSTRUCTION PIPELINE OF A VIRTUAL MEMORY SYSTEM-BASED DIGITAL COMPUTER, 07/306,866 filed Feb. 3, 1989; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, 07/306,544 filed Feb. 3, 1989; Hetherington et al., WRITE BACK BUFFER WITH ERROR CORRECTING CAPABILITIES, 07/306,703 filed Feb. 3, 1989; Flynn et al., METHOD AND MEANS FOR ARBITRATING COMMUNICATION REQUESTS USING A SYSTEM CONTROL UNIT IN A MULTI-PROCESSING SYSTEM, 07/306,871 filed Feb. 3, 1989; Chinnasway et al., MODULAR CROSSBAR INTERCONNECTION NETWORK FOR DATA TRANSACTIONS BETWEEN SYSTEM UNITS IN A MULTI-PROCESSOR SYSTEM, 07/306,336 filed Feb. 3, 1989; Polzin et al., METHOD AND APPARATUS FOR INTERFACING A SYSTEM CONTROL UNIT FOR A MULTI-PROCESSOR SYSTEM WITH INPUT/OUTPUT UNITS, 07/306,862 filed Feb. 3, 1989; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, 07/306,404 filed Feb. 3, 1989; and Gagliardo et al., METHOD AND MEANS FOR ERROR CHECKING OF DRAM-CONTROL SIGNALS BETWEEN SYSTEM MODULES, 07/306,836 filed Feb. 3, 1989.

FIELD OF THE INVENTION

This invention relates generally to an apparatus in a high-speed, digital computer system for controlling the rate at which data is stored, and more particularly, to an apparatus for increasing the data storage bandwidth by combining consecutively located storage requests into a single storage operation.

DESCRIPTION OF THE RELATED ART

In the field of high-speed, digital computers it is conventional for a computer system to employ an architecture that is generally of a predefined width, such as 32-bits. Accordingly, most data paths within the computer system are 32-bits wide, including busses, arithmetic logic units, register files, and cache access paths. However, not all data structures within the computer system are of the same size. In fact, some are narrower, but many are wider, including, for example: double precision floating point numbers; character strings; binary coded decimal strings; 64-bit integers (quadwords); 128-bit integers (octawords); instructions; and stackframes.

These wider data structures are typically employed in high-frequency operations within the computer system. Therefore, in order to increase overall system performance, and prevent bottlenecking, the data paths handling these wider, high-frequency structures have been correspondingly widened. Clearly, by making the data path wider, the amount of data that can be delivered over the path is increased.

There are competing design interests that works against making all data paths wider. First, wider data paths increase the overall cost of the computer system and in some cases offer only negligible increased performance. Alternatively, the wider data path may be needed for only a relatively few of its intended operations. Thus, in this case, while the performance increase for individual functions may be dramatic, the overall impact on system performance does not warrant the increased cost.

Finally, while the data structures being communicated may be significantly wider than their data path, the bandwidth of the path may be performance limited, such that simply increasing the path width will have no better effect than optimizing the current data path. For example, in the VAX architecture, the data path from the execution unit to the cache is only 32-bits wide even though the execution unit is capable of performing 64-bit (quadword) storage operations. The quadword is broken down into two 32-bit data structures (longwords) and sequentially transferred over the 32-bit data path. While it may at first seem that the data storage rate could be doubled by increasing the data path to 64-bits, it is not quite that simple. Caching techniques generally require two clock cycles to perform each storage operation. Therefore, even if the data path could deliver 64-bits per cycle, the data storage rate of the cache would only be 64-bits every two cycles.

The present invention is directed to overcoming one or more of the problems as set forth above.

SUMMARY OF THE INVENTION

The primary object of the present invention is to increase the rate at which data can be stored in the cache without increasing the width of the data bus connected to the cache.

Another object of the present invention is to provide an apparatus and method for identifying and pairing consecutive longword storage operations, which are quadword aligned, and storing both longwords in a single storage operation.

In one aspect of the invention an apparatus is provided for controlling the flow of data to a cache of a computer system. The apparatus includes means for delivering a first longword of data, an address at which the data is to be stored, and a signal indicating that a second longword of data to be stored in the adjacent address will be delivered in the following clock cycle. A primary writebuffer has an output connected to a low-order section of the cache and an input adapted to receive the first longword of data. A secondary writebuffer has an output connected to a high-order section of the cache and an input adapted to receive the second longword of data in response to the first longword being quadword aligned and the second longword of data actually being delivered during the following clock cycle. The apparatus further includes means for substantially simultaneously enabling the high and low-order sections of the cache at the indicated address, whereby the contents of the primary and secondary buffers are stored as a quadword at the address in the cache.

In another aspect of the present invention, a method is provided for controlling the flow of data to a cache of a computer system during a two clock cycle period of time. The method includes the steps of delivering a first longword of data, an address at which the data is to be stored, and a context signal during the first clock cycle. The context signal indicates that a second longword of data to be stored in the adjacent address will be delivered in the second clock cycle. The first longword of data is stored in a primary writebuffer during the first clock cycle. The second longword of data is stored in a secondary writebuffer during the second clock cycle. The second longword is stored in response to the first longword being quadword aligned and the second longword of data actually being delivered during the second clock cycle. The method further includes the step of substantially simultaneously enabling the high and low-order sections of the cache at the indicated address during the second clock cycle, whereby the contents of the primary and secondary buffers are stored as a quadword at the address in the cache.

BRIEF DESCRIPTION OF THE DRAWINGS

Other objects and advantages of the invention will become apparent upon reading the following detailed description and upon reference to the drawings in which:

FIG. 4 is a timing diagram of significant control events occurring in the translation buffer and memory access unit;

FIG. 5 is a timing diagram of significant control events occurring in the translation buffer and memory access unit during nonoptimized write operations.

Figure 1:
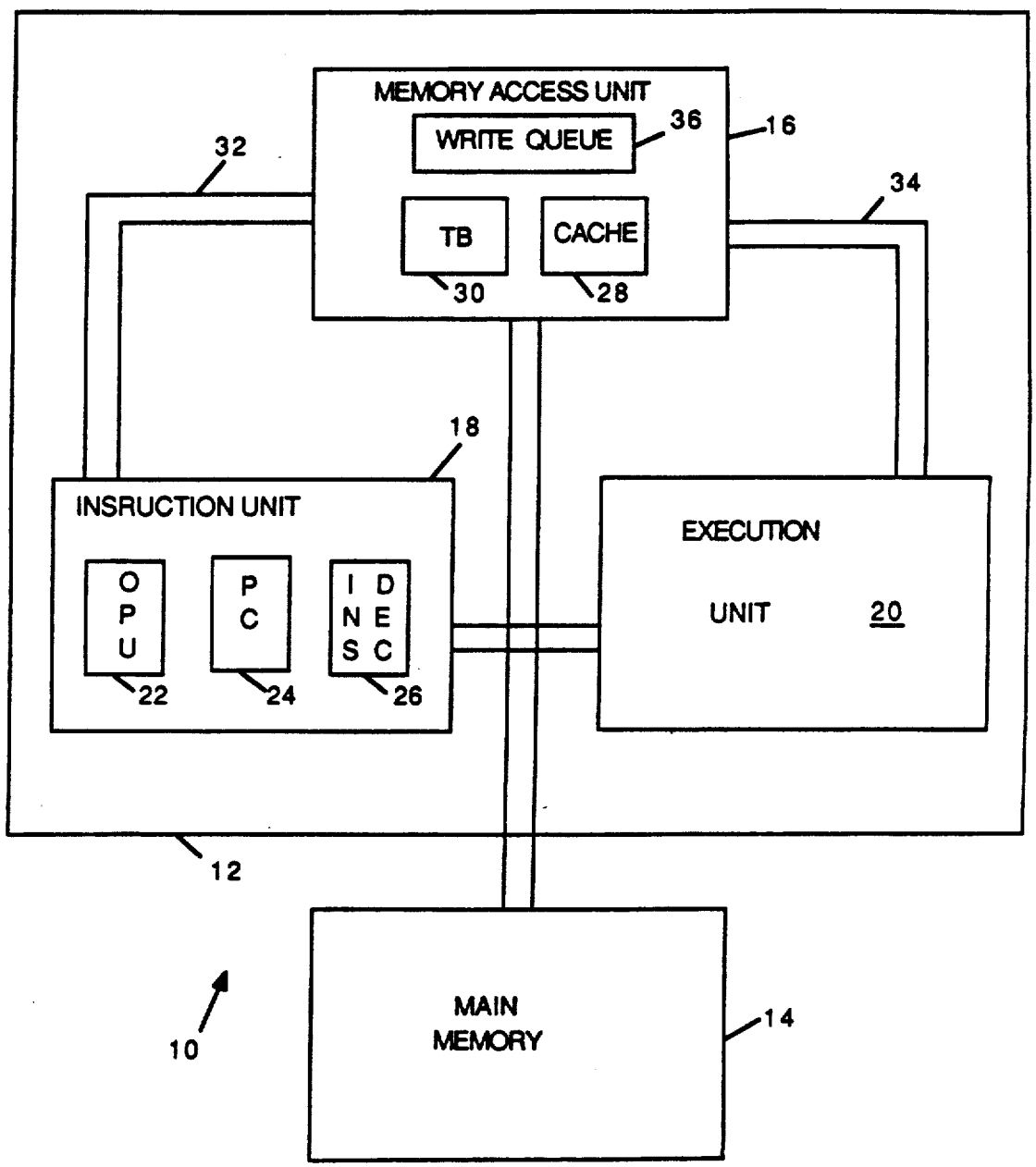
FIG. 1 is a top level block diagram of a portion of a central processing unit and associated memory.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

FIG. 1 is a top level block diagram of a portion of a pipelined computer system 10. The system 10 includes at least one central processing unit (CPU) 12 having access to main memory 14. It should be understood that additional CPUs could be used in such a system by sharing the main memory 14. It is practical, for example, for up to four CPUs to operate simultaneously and communicate efficiently through the shared main memory 14.

Inside the CPU 12, the execution of an individual instruction is broken down into multiple smaller tasks. These tasks are performed by dedicated, separate, independent functional units that are optimized for that purpose.

Although each instruction ultimately performs a different operation, many of the smaller tasks into which each instruction is separated are common to all instructions. Generally, the following steps are performed during the execution of an instruction: instruction fetch, instruction decode, operand fetch, execution, and result store. Thus, by the use of dedicated hardware stages, the steps can be overlapped, thereby increasing the total instruction throughput.

The data path through the pipeline includes a respective set of registers for transferring the results of each pipeline stage to the next pipeline stage. These transfer registers are clocked in response to a common system clock. For example, during a first clock cycle, the first instruction is fetched by hardware dedicated to instruction fetch. During the second clock cycle, the fetched instruction is transferred and decoded by instruction decode hardware, but, at the same time, the next instruction is fetched by the instruction fetch hardware. During the third clock cycle, each instruction is shifted to the next stage of the pipeline and a new instruction is fetched. Thus, after the pipeline is filled, an instruction will be completely executed at the end of each clock cycle.

This process can be analogized to an assembly line in a manufacturing environment. Each worker is dedicated to performing a single task on every product that passes through his or her work stage. As each task is performed the product comes closer to completion. At the final stage, each time the worker performs his assigned task a completed product rolls off the assembly line.

As shown in FIG. 1. the CPU 12 is partitioned into at least three functional units: a memory access unit 16, an instruction unit 18, and an execution unit 20. These units are sometimes referred to as the MBOX, IBOX and EBOX, respectively.

The instruction unit 18 prefetches instructions, decodes opcodes to obtain operand and result specifiers, fetches operands, and updates a program counter 24. The instruction unit 18 includes an operand processing unit 22, the program counter 24, and an instruction decoder 26. The program counter 24 is maintained in the instruction unit 18 so that the proper instructions can be retrieved from a high-speed cache memory 28 maintained in the memory access unit 16. The cache 28 stores a copy of a small portion of the information stored in main memory 14 and is employed to increase processing speed by reducing memory access time. Operation of the cache 28 is described in greater detail below in conjunction with the description of the memory access unit 16.

The program counter 24 preferably uses virtual memory locations rather than the physical memory locations of the main memory 14 and cache 28. Thus, the virtual address of the program counter 24 must be translated into the physical address of the main memory 14 before instructions can be retrieved. Accordingly, the contents of the program counter 24 are transferred to the memory access unit 16 where a translation buffer 30 performs the address conversion. The instruction is retrieved from its physical memory location in the cache 28 using the converted address. The cache 28 delivers the instruction over the data return lines 32 to the instruction decoder 26. The organization and operation of the cache 28 and translation buffer 30 are further described in Chapter 11 of Levy and Eckhouse, Jr., Computer Programming and Architecture, The VAX-11, Digital Equipment Corporation, pp. 351-368 (1980).

The operand processing unit (OPU) 22 also produces virtual addresses. In particular, the OPU 22 produces virtual addresses for memory source (read) and destination (write) instructions. For at least the memory read instructions, the OPU 22 must deliver these virtual addresses to the memory access unit 16 where they are translated to physical addresses. The physical memory locations of the cache 28 are then accessed to fetch the operands for the memory source instructions.

In order to practice the preferred method of the present invention, the OPU 22 also delivers to the memory access unit 16 the virtual addresses of the destinations for the memory destination instruction operands. The virtual address, for example, is a 32-bit number. In addition to transmitting the 32-bit virtual address, the OPU 22 also delivers a 3-bit control field to indicate whether the instruction specifies a read or write operation. In the event that the control field indicates that the virtual address corresponds to a read instruction, the cache 28 retrieves the data from the identified physical memory location and delivers it over data return lines 34 to the execution unit 20.

Conversely, for a write operation the write address is stored until the data to be written is available. Clearly, for instructions such as MOVE or ADD, the data to be written is not available until execution of the instruction has been completed. However, the virtual address of the destination can be translated to a corresponding physical address during the time required for execution of the instruction. Also, it is desirable for the OPU 22 to preprocess multiple instruction specifiers during this time in order to increase the overall rate at which instructions are performed. For these purposes, the memory access unit 16 is provided with a "write queue" 36 intermediate the translation buffer 30 and the cache 28 for storing the physical destination addresses of a variable number of write operations. The write queue 36 maintains the address until the execution unit 20 completes the instruction and sends the resulting data to the memory access unit 16. This data is paired with the previously stored write address and written into the cache 28 at that memory location.

The OPU 22 also operates on instructions which are not memory operands. For example, the OPU 22 also processes immediate operands, short literals and register operands. In each of these types of instructions the OPU 22 delivers its results directly to the execution unit 20.

The first step in processing the instructions is to decode the "opcode" portions of the instruction. The first portion of each instruction consists of its opcode which specifies the operation to be performed in the instruction. The decoding is done using a standard table-lookup technique in the instruction decoder 26. The instruction decoder 26 finds a microcode starting address for executing the instruction in a look-up table and passes that starting address to the execution unit 20. Later, the execution unit 20 performs the specified operation by executing prestored microcode, beginning at the indicated starting address. Also, the decoder 26 determines where source-operand and destination-operand specifiers occur in the instruction and passes these specifiers to the operand processing unit 22 for preprocessing prior to execution of the instruction.

Figure 2:
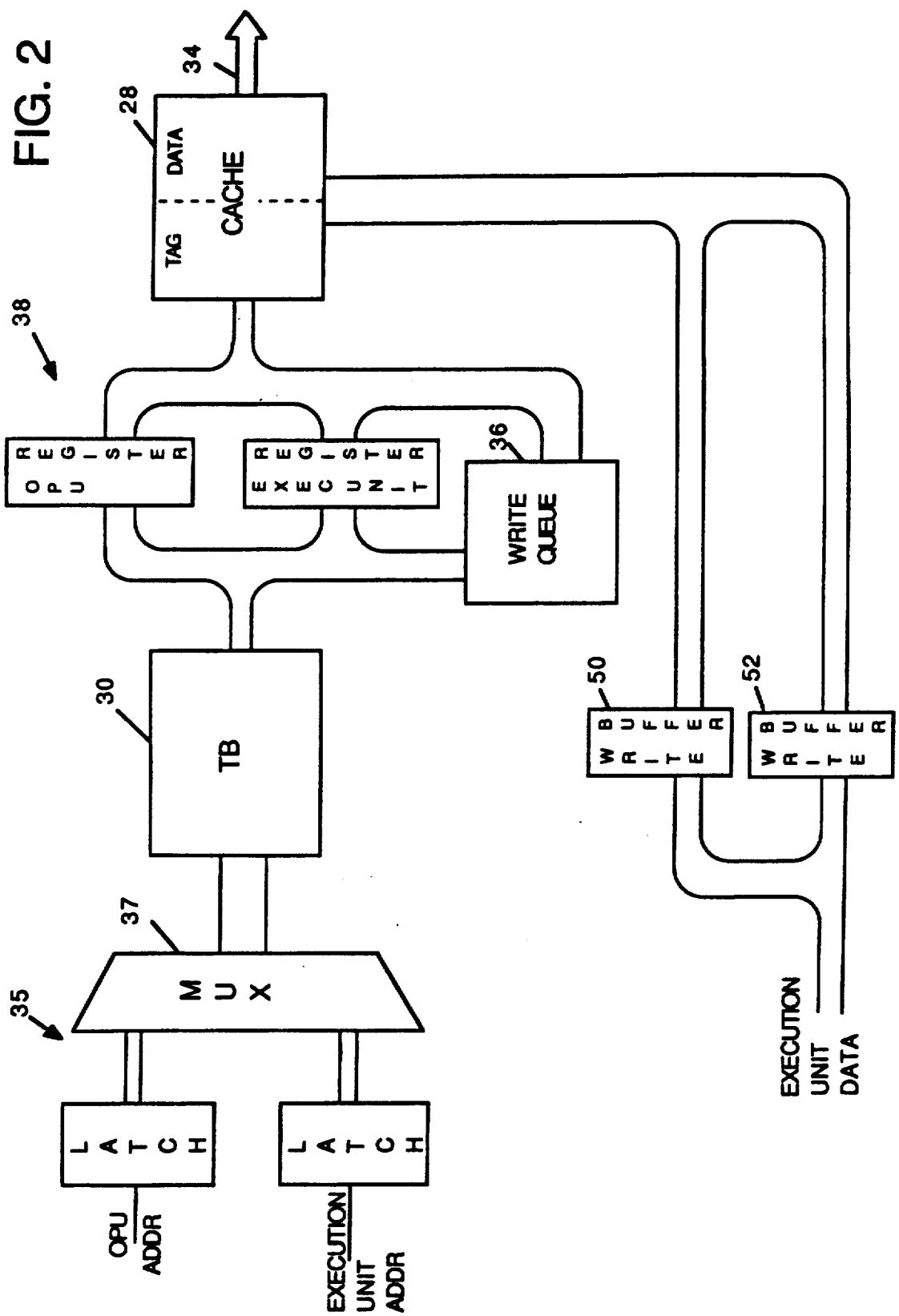
FIG. 2 is a block diagram of the translation buffer and cache sections of the memory access unit.

Referring now to FIG. 2, the memory access unit 16 includes the cache 28, the translation buffer 30, the write queue 36, and a group of registers 38. As noted above, the cache 28 is a high-speed memory that stores a copy of a small portion of the information stored in the main memory 14. The cache 28 is accessible at a much higher rate than the main memory 14. Its purpose, therefore, is to reduce the average time necessary for a memory access (i.e., a read or write) to be performed. Since the cache 28 stores only a small portion of the information stored in the main memory 14, there will occasionally be instructions that attempt to access memory not contained in the cache 28. The cache 28 recognizes when these "misses" occur, and in these instances the cache 28 retrieves the identified data from the main memory 14. Of course, during these "misses" performance of the CPU 12 will suffer. However, with the cache 28 the overall memory access speed is increased.

The translation buffer 30 is a high-speed, associative memory that stores the most recently used virtual-to-physical address translations. In a virtual memory system, a reference to a single virtual address can cause several memory references before the desired information is made available. However, where the translation buffer 30 is used, translation is reduced to simply finding a "hit" in the translation buffer 30. This "hit" is indicated by a hit signal. These virtual addresses generated by the OPU 22 and execution unit 20 are stored in latches 35, where they are maintained until they are accessed via a multiplexer 37 and serviced by the translation buffer 30.

Once the virtual-to-physical address translation is complete, the physical address is transferred to the write queue 36 or one of the registers 38. As its name suggests, the write queue 36 receives the physical address only if the corresponding operation is a write to memory. The purpose of the write queue 36 is to provide a temporary storage location for the physical write address of the write operation. Because of the pipeline nature of the CPU 12, the write address is available before the data to be stored therein is available. In fact, the data will only become available after the execution of the instruction in the execution unit 20. Moreover, because it is desired to preprocess multiple operand specifiers for instructions in the pipeline, it is likely that there will be a plurality of physical write addresses waiting for their corresponding data. Accordingly, the write queue 36 is a multiple position first-in, first-out buffer constructed to accommodate a plurality of physical write addresses.

Conversely, if the operation corresponding to the physical address is a read operation, then the translation buffer 30 provides the physical address for an operand of the read operation. The read address is transferred to one of the registers 38 where it is selected by a multiplexer 40 and delivered to the cache 28. The cache 28 accesses the identified memory location and delivers the data stored at that location to the execution unit 20 via the data return lines 34.

The cache 28 is divided into two sections, a data storage area and a tag storage area. Since the cache 28 contains only a portion of the main memory 14, the tag storage area is necessary in order to keep track of what data is currently located in the data storage area. Thus, during a cache read operation, the tag and data storage areas are accessed in the same clock cycle, using the physical address in one of the registers 38. If the desired data is available in the cache, then read data is immediately available in the next clock cycle. As long as the requested data is available in the cache 28, then the cache 28 is capable of performing one read operation every clock cycle.

Conversely, the cache 28 is only capable of performing one write operation every other clock cycle. During a write operation the tag storage area must be interrogated before the new data is written. Otherwise, data already present in the cache 28 could be overwritten and destroyed. Thus, during a write operation, the tag storage area is accessed in the first clock cycle and the data storage area is accessed in the second clock cycle.

Accordingly, it can be seen that even if the data path between the execution unit 20 and the cache 28 is 64-bits wide, data is stored in the cache 28 at the rate of 32-bits per clock cycle (64-bits every two cycles). The maximum bandwidth of the data path is 32-bits per cycle. However, since the cache 28 is capable of performing 64-bit storage operations, then the 32-bit data path can perform at the same rate as a 64-bit data path if consecutive 32-bit write operations can be paired together and stored in one 64-bit operation.

Where multiple 32-bit words are to be written, they are usually adjacent in memory. Furthermore, most data is naturally aligned in memory. A naturally aligned quadword has an address in which the three least significant bits are zero. Also note that a quadword is composed of two longwords. It is, therefore, likely that two consecutive longword write operations from the execution unit 20 will fit within the same aligned quadword in the cache 28. This is typically true for double precision floating point data, string data, procedure call stack frames, etc.

As shown in FIG. 2, a primary and secondary writebuffer 50, 52 are connected in parallel to the 32-bit data bus from the execution unit 20. The outputs of the primary and secondary write buffers 50, 52 are respectively connected to the lower and upper 32-bits of a 64 bit data path into the cache 28. This 64-bit data path also interconnects the cache 28 with the main memory 14 and is used to refill the cache 28 from the main memory 14. It should be noted that during a cache refill the tag storage area does not need to be interrogated. Unlike an execution unit initiated write operation, a write operation during a cache refill can be performed during every clock cycle. Thus, in this case the 64-bit data path optimizes the data storage rate for cache refills.

The primary writebuffer 50 ordinarily receives and stores the data to be written to the cache 28. The secondary writebuffer 52 only receives and stores data in the event that the execution unit 20 delivers the second of two consecutive longword write operations. Thereafter, the cache 28 accepts a longword of data from each of the writebuffers 50, 52. The secondary writebuffer 52 is only used during this optimization of paired longword write operations.

Figure 3:
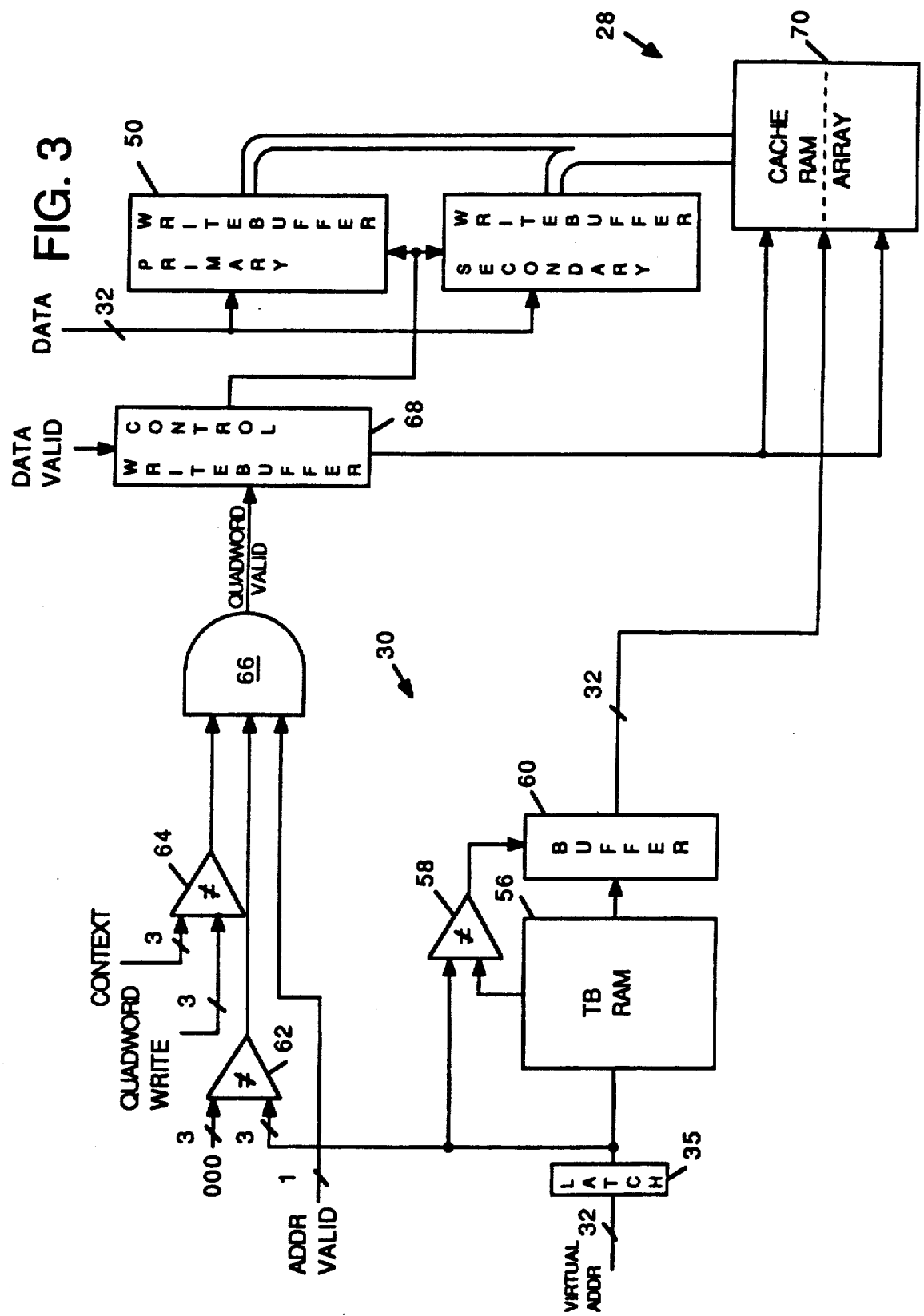
FIG. 3 is a functional diagram of the internal operations of the translation buffer and cache.

Referring now to FIG. 3, a functional diagram of the internal operation of the translation buffer 30, cache 28, and writebuffer 50, 52 control signals is shown. The translation buffer 30 receives four different type signals from the execution unit 20: a 32-bit virtual address; a 1-bit address valid signal; a 5-bit command signal; and a 3-bit context signal. The 32-bit virtual address is, as discussed above, stored in the latch 35 from where it is ultimately accessed by the multiplexer 37 and converted from a virtual to a physical address. The low-order bits act as a pointer into the RAM 56. The high-order address bits of the data actually stored in that RAM location are presented to a comparator 58 along with the high-order bits of the virtual address. If they match, then the address stored in the RAM location is the corresponding physical address and it is clocked into a buffer 60 by the output signal of the comparator 58, which is the "hit" signal.

At the same time, in order to determine if this address corresponds to the first longword of an optimized quadword write operation, the translation buffer 30 must determine if three conditions are satisfied. First, the address must be quadword aligned in order to perform a quadword write operation. To determine if the address is quadword aligned, it is only necessary to inspect the low-order 3-bits of the virtual address. Accordingly, a 3-bit comparator 62 has a first input connected to the low-order 3-bits of the virtual address and a second input connected to a preselected constant value of 000.

The second condition requires that the execution unit 20 actually be requesting a quadword write operation. The 3-bit context signal provided by the execution unit 20 contains a preselected code that identifies the size of the operation to be performed while the 5-bit command field indicates the type (i.e. write) of the operation. The execution unit 20 can request quadword, longword, or byte write operations. The optimization will only occur if the execution unit 20 has requested a quadword write operation. Thus, a 3-bit comparator 64 has a first input connected to the context signal and a second input connected to a preselected constant value that matches the code for a quadword write request.

The outputs of the comparators 62, 64 are connected to the inputs of a 3-input AND gate 66. The third input to the AND gate 66 is connected directly to the address valid signal from the execution unit 20. The address valid signal indicates that the execution unit 20 has properly delivered the subsequent longword address and corresponding data in time for the quadword optimization to occur. Thus, the AND gate 66 delivers a 1-bit quadword valid signal to the cache 28, thereby enabling the cache 28 to receive a longword of data from each of the writebuffers 50, 52.

Within the cache 28, a buffer control 68 receives the quadword valid signal along with a data valid signal from the execution unit 20. The data valid signal is delivered by the execution unit 20 to indicate that data has been placed on the 32-bit data bus. Ordinarily, during nonoptimized data transfers and during the transfer of the low-order longword of an optimized data transfer, the buffer control 68 produces a hold signal to the primary writebuffer 50, allowing the writebuffer 50 to store the data currently presented on the data bus. The buffer control 68 produces this primary hold signal in response to receiving the data valid signal in the absence of the quadword valid signal.

On the other hand, when both the quadword and data valid signals are present, the buffer control 68 outputs a hold signal to the secondary writebuffer 52, causing it to store the data currently present on the bus. In this manner, during an optimized quadword write operation, the writebuffers 50, 52 are consecutively loaded with the lower and upper longwords of the quadword data.

A 64-bit RAM array 70 contained within the cache 28 is divided into two sets of 32-bit storage locations where each 32-bit set has an independently operable enable input. The 32-bit physical address from the translation buffer 30 acts as a pointer into the RAM array 70 and both of the enable inputs are connected to the quadword valid signal. Thus, during an optimized quadword write when the quadword valid signal is asserted, both longwords of the RAM array 70 are enabled to store the two longwords currently held in the writebuffers 50, 52.

The timing and operation of the optimized quadword write operation may be better appreciated by referring to the timing diagrams illustrated in FIG. 4. Five clock cycle periods A-E are illustrated for the context, data, and quadword valid signals, as well as the cache lookup and write operations. Beginning in clock cycle A, the execution unit 20 issues a context signal indicating that the data and address currently being delivered corresponds to the first longword of a quadword write operation. Shortly thereafter, the first 32-bits of data along with the data valid signal are delivered from the execution unit 20 to the primary writebuffer 50. In the absence of the quadword valid signal, the buffer control 68 enables the primary writebuffer 50 to save the first longword of data. At the same time, the translation buffer 30 performs the virtual to physical address conversion and delivers the resulting physical address to the cache 28.

In clock cycle B the execution unit 20 issues another context signal indicating that the data and address currently being delivered correspond to the second longword of a quadword write operation. Shortly thereafter the second 32-bits of data along with the data valid signal are delivered from the execution unit 20 to the secondary writebuffer 52. Since the execution unit 20 has successfully delivered the second longword of data, the address valid signal is asserted, thereby causing the quadword valid signal to be similarly asserted. The presence of the quadword valid signal results in the buffer control 68 enabling the secondary writebuffer 52 to save the second longword of data.

It should be remembered that the cache 28 requires two clock cycles to perform a write operation. The first clock cycle involves looking up the tag in the cache RAM array 70 to prevent overwriting good data and the second clock cycle is dedicated to actually writing the data into the RAM array 70. Thus, during clock cycle B the cache 28 performs the lookup function.

In clock cycle C the asserted quadword valid signal ensures that both 32-bit sections of the ram array 70 are enabled so that both the primary and secondary writebuffers 50, 52 are loaded into the ram array 70. At the same time, the execution unit 20 is sending the quadword context signal for the next quadword of data to be written into the cache 28. Clock cycles C and D are substantially identical to clock cycles A and B. Thus, during clock cycle C and every second clock cycle thereafter, a 64-bit cache write operation is performed.

It should be appreciated that the logical conditions described in the timing diagrams of FIG. 4 represent the maximum data transfer rate from the execution unit 20 to the cache 28. Thus, using only a 32-bit data bus and constrained by the cache 28 being able to perform only one write operation every two clock cycles, the instant invention achieves an effective transfer rate of 32-bits per clock cycle.

In contradistinction thereto, the timing diagrams of FIG. 5 represent the transfer of data between the execution unit 20 and the cache 28 where an optimized quadword transfer is attempted, but fails. Even though the optimized quadword transfer fails, an ordinary longword transfer is still accomplished, allowing the CPU to continue operating, albeit at a temporarily slower rate.

In clock cycle A, the execution unit 20 issues the quadword address valid, indicating that the data and address currently being delivered correspond to the first longword of a quadword write operation. Shortly thereafter the first 32-bits of data along with the data valid signal are delivered from the execution unit 20 to the primary writebuffer 50. In the absence of the quadword valid signal, the buffer control 68 enables the primary writebuffer 50 to save the first longword of data. At the same time, the translation buffer 30 performs the virtual to physical address conversion and delivers the resulting physical address to the cache 28.

In clock cycle B the execution unit 20 fails to issue another context signal, thereby indicating that the desired longword data and address are not currently being delivered. Thus, the quadword valid signal is not asserted, the secondary writebuffer 52 is not enabled to save any data present on the bus, and both 32-bit sections of the RAM array 70 are not enabled. The cache 28 performs the lookup in clock cycle B and the write operation in clock cycle C, but, only the lower 32-bit section of the RAM array 70 is enabled to receive only the contents of the primary writebuffer 50.

Therefore, the effective data transfer rate is only one-half the optimized quadword transfer rate. Here, a 32-bit longword is transferred every second clock cycle thereafter.

Further, it should be noted that the timing diagram for a failed optimized quadword transfer is substantially identical to an ordinary longword transfer. The only difference is in clock cycle A where the execution unit 20 delivers a context signal corresponding to a longword transfer rather than a quadword transfer. Therefore, even a failed optimized quadword transfer has the same effective transfer rate as an unoptimized longword transfer.

Figure 6:
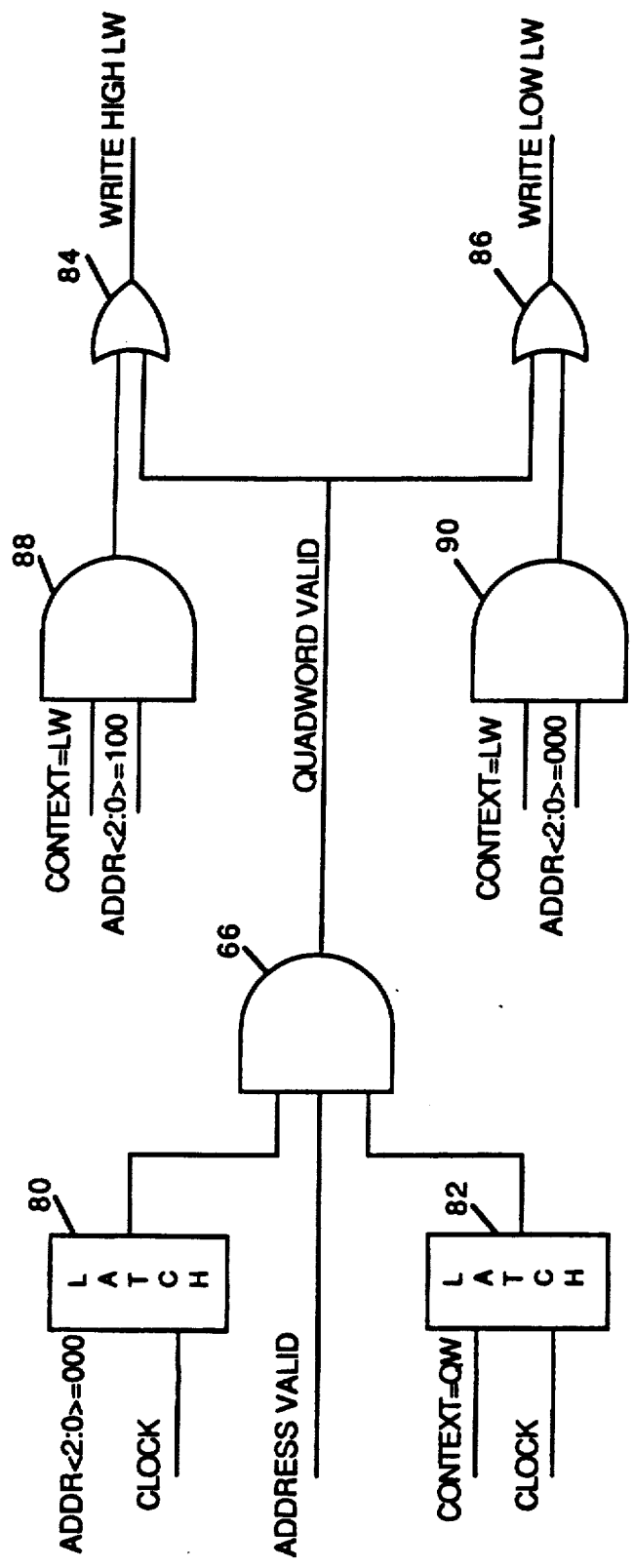
FIG. 6 is a logic diagram of the cache RAM enable signals.

FIG. 6 is a logic diagram of the cache RAM enable signals. The AND gate 66 receives inputs from a pair of latches 80, 82 and the address valid signal from the execution unit 20. The latch 80 has an input connected to the output of the comparator 62 where that signal is indicative of the quadword address being quadword aligned. The latch 82 has an input connected to the output of the comparator 64 where that signal is representative of a context signal from the execution unit 20 indicating a quadword write is being requested. The output of the AND gate 66 is the quadword valid signal, which is passed through a pair of OR gates 84, 86 to the enable inputs of the high and low 32-bit sections of the cache RAM array 70.

Each of the OR gates 84, 86 also have a second input for enabling the high and low 32-bit sections of the RAM array 70. The high 32-bit section is also enabled when the context signal corresponds to a longword write request and the address of the longword write request corresponds to the high 32-bit section of the RAM array 70. An AND gate 88 receives inputs of context=longword and address=001. Thus, the output of the AND gate 88 is asserted only when the execution unit has requested a longword write operation and the address to be written corresponds to the upper 32-bit section.

Similarly, the low 32-bit section is also enabled when the context signal corresponds to a longword write request and the address of the longword write request corresponds to the low 32-bit section of the RAM array 70. An AND gate 90 receives inputs of context=longword and address=000. Further, the original context signal requesting a quadword transfer is demoted to a longword request and passed to the inputs of the AND gates 88, 90.

Therefore, when the optimized quadword transfer is possible, the quadword valid signal is passed through the OR gates 84, 86 to the high and low enable inputs of the RAM array 70. On the other hand, even where the optimized quadword transfer fails, the demoted quadword context signal is passed through the appropriate AND gate 88, 90 to either the low or high enable inputs of the RAM array 70.

We claim:

1. A method for controlling data flow from an execution unit over a longword size bus to a cache in a memory access unit of a computer system during first and second clock cycles of a two clock cycle period of time, said cache having a multiplicity of addressable cache blocks and a quadword size data access path over which a quadword of data is written to said cache in the second clock cycle of said two clock cycle period of time, said method comprising the steps of:

(a) during the first cycle of said two clock cycle period of time, receiving a first longword of data from said execution unit, said first longword of data having been delivered over said longword size bus to said cache, storing said first longword of data in a buffer in said memory access unit, and addressing said cache with a cache block address to which said first longword of data is to be written to obtain a hit signal when an addressed cache block is free to receive said first longword of data, and (b) during the second clock cycle of said two clock cycle period of time, in response to said hit signal indicating that said addressed cache block is free to receive said first longword of data and a quadword context signal indicating that said first longword of data is to be paired with a second longword of data to form a quadword of data and a quadword aligned address signal indicating that the quadword of data is to be stored at an address aligned with said cache block address, receiving said second longword of data from said execution unit, said second longword of data having been delivered over said longword size bus to said cache, and storing in said addressed cache block said second longword of data from said longword size bus together with said first longword of data from said buffer by passing said first and second longwords of data over respective different portions of said quadword data access path.

2. The method as claimed in claim 1, further comprising the step of inhibiting said storing of said first and second longwords of data in said addressed cache block when a data valid signal is not transmitted by said execution unit and received by said memory access unit during said second clock cycle.

3. The method as claimed in claim 1, wherein said first and second longwords each consist of four bytes, and said quadword consists of eight bytes.

4. A computer system having an execution unit and a memory access unit; a bus linking said memory access unit and said execution unit; said memory access unit including a cache memory for storing data; wherein the improvement comprises:

said execution unit including means for executing write instructions, said write instructions including longword write instructions and quadword write instructions, each of said write instructions specifying a destination address;

said cache memory connected to a quadword size data access path for writing longwords and quadwords of data into said cache memory;

said bus having a longword size data path for conveying a longword of data from said execution unit to said memory access unit to be written into said cache memory in executing each of said write instructions;

said execution unit further including means, connected to said executing means and said longword size data path, for transmitting a first longword of data over said longword size data path when executing each of said longword write instructions, each of said longword write instructions specifying said first longword, and for successively transmitting first and second longwords of a quadword of data over said longword size data path when executing each of said quadword write instructions, each of said quadword write instructions specifying said first and second longwords of the quadword of data;

said memory access unit including a first write buffer having an input connected to said longword size data path and an output connected to a low-order section of said quadword size data access path for receiving and storing a longword from said longword size data path which is to be stored in said cache memory at a destination address that is aligned on quadword boundaries, and a second write buffer having an input connected to said longword size data path and an output connected to a high-order section of said quadword size data access path for receiving and storing a longword from said longword size data path which is to be stored in said cache memory at a destination address that is not aligned on quadword boundaries;

said execution unit further including means, connected to said executing means and said bus, for generating a context signal over said bus when each of said write instructions is executed, said context signal indicating whether each of said write instructions is either a longword write instruction or a quadword write instruction;

said execution unit further including means, connected to said executing means and said bus, for generating an address alignment signal over said bus when each of said write instructions is executed, said address alignment signal indicating whether the destination address specified by each of said write instructions is either aligned on a quadword boundary or is not aligned on a quadword boundary; and control means, connected to said bus, said first and second write buffers, and said cache memory, responsive to said context signal and said address alignment signal for writing said first longword of data specified by each of said longword write instructions from said first write buffer over said low-order section into said cache memory when said context signal indicates a longword write instruction and said address alignment signal indicates that the destination address specified by each of said longword write instructions is aligned on a quadword boundary, for writing said first longword of data specified by each of said longword write instructions from said second write buffer over said high-order section into said cache memory when said context signal indicates a longword write instruction and said address alignment signal indicates that the destination address specified by each of said longword write instructions is not aligned on a quadword boundary, and for writing said first and second longwords of said quadword of data specified by each of said quadword write instructions from said first write buffer over said low-order section and from said second write buffer over said high-order section into said cache memory when said context signal indicates a quadword write instruction and when said address alignment signal indicates that the destination address specified by each of said quadword write instructions is aligned on a quadword boundary.

5. The improvement as claimed in claim 4, wherein said first and second write buffers are each one longword wide, and have their inputs connected in parallel to said longword size data path.

6. The improvement as claimed in claim 4, wherein said transmitting means includes means, connected to said executing means and said bus, for transmitting the destination address specified by each of said write instructions over said bus when executing each of said write instructions; said memory access unit further includes determining means, connected to said bus and said cache memory, responsive to said destination address for determining whether said cache memory has data stored at said destination address to provide a hit signal when said cache memory has data stored at said destination address; said control means further being connected to said determining means and being responsive to said hit signal to disable the writing of longwords of data from said first and second write buffers into said cache memory in an absence of said hit signal; and wherein said determining means includes means for performing a lookup in said cache memory during transmission over said bus of the second longword of each of said quadword write instructions to determine whether said cache memory has data stored at the destination address of each of said quadword write instructions so that a presence of said hit signal enables the writing of longwords of data from said first and second write buffers into said cache memory upon receipt from said bus of the second longword of each of said quadword write instructions.

7. The improvement as claimed in claim 4, wherein said execution unit further includes means, connected to said executing means and said bus, for generating a data valid signal over said bus indicating the second longword of the quadword specified by each of said quadword write instructions is valid; and said control means is responsive to said data valid signal for inhibiting the writing of the quadword of data from the first and second write buffers into said cache memory until said data valid signal indicates receipt of a valid second longword of data for the quadword.

8. The improvement as claimed in claim 4, wherein the first and second longwords each consist of four bytes, and the quadword consists of eight bytes.

9. A computer system having an execution unit and a memory access unit; a bus linking said memory access unit and said execution unit; said memory access unit including a cache memory for storing data; wherein the improvement comprises:

said execution unit including means for executing write instructions, said write instructions including longword write instructions and quadword write instructions, each of said write instructions specifying a destination address;

said cache memory connected to a quadword size data access path for writing longwords and quadwords of data into said cache memory;

said bus having a longword size data path for conveying a longword of data from said execution unit to said memory access unit to be written into said cache memory in executing each of said write instructions;

said execution unit further including means, connected to said executing means and said longword size data path, for transmitting a first longword of data over said longword size data path when executing each of said longword write instructions, each of said longword write instructions specifying said first longword, and for successively transmitting first and second longwords of a quadword of data over said longword size data path when executing each of said quadword write instructions, each of said quadword write instructions specifying said first and second longwords of the quadword of data;

said memory access unit including a longword-size first write buffer having an input connected to said longword size data path and an output connected to a low-order section of said quadword size data access path for receiving and storing a longword from said longword size data path which is to be stored in said cache memory at a destination address that is aligned on quadword boundaries, and a longword-size second write buffer having an input connected to said longword size data path and an output connected to a high-order section of said quadword size data access path for receiving and storing a longword from said longword size data path which is to be stored in said cache memory at a destination address that is not aligned on quadword boundaries;

said execution unit further including means, connected to said executing means and said bus, for generating a context signal over said bus when each of said write instructions is executed, said context signal indicating whether each of said write instructions is either a longword write instruction or a quadword write instruction;

said execution unit further including means, connected to said executing means and said bus, for generating an address alignment signal when each of said write instructions is executed, said address alignment signal indicating whether the destination address specified by each of said write instructions is either aligned on a quadword boundary or is not aligned on a quadword boundary;

said execution unit further including means, connected to said executing means and said bus, for generating a data valid signal over said bus indicating the second longword of the quadword specified by each of said quadword write instructions is valid;

control means, connected to said bus, said first and second write buffers, and said cache memory, responsive to said context signal and said address alignment signal for writing said first longword of data specified by each of said longword write instructions from said first write buffer over said low-order section into said cache memory when said context signal indicates a longword write instruction and said address alignment signal indicates that the destination address specified by each of said longword write instructions is aligned on a quadword boundary, for writing said first longword of data specified by each of said longword write instructions from said second write buffer over said high-order section into said cache memory when said context signal indicates a longword write instruction and said address alignment signal indicates that the destination address specified by each of said longword write instructions is not aligned on a quadword boundary, and for writing said first and second longwords of said quadword of data specified by each of said quadword write instructions from said first write buffer over said low-order section and from said second write buffer over said high-order section into said cache memory when said context signal indicates a quadword write instruction and when said address alignment signal indicates that the destination address specified by each of said quadword write instructions is aligned on a quadword boundary, said control means further being responsive to said data valid signal for inhibiting the writing of the quadword of data from the first and second write buffers into said cache memory until said data valid signal indicates receipt of a valid second longword of data for the quadword;

said transmitting means including means, connected to said executing means and said bus, for transmitting the destination address specified by each of said write instructions over said bus when executing each of said write instructions; said memory access unit further including determining means, connected to said bus and said cache memory, responsive to said destination address for determining whether said cache memory has data stored at said destination address to provide a hit signal when said cache memory has data stored at said destination address; said control means further being connected to said determining means and being responsive to said hit signal to disable the writing of longwords of data from said first and second write buffers into said cache memory in an absence of said hit signal; and wherein said determining means includes means for performing a lookup in said cache memory during transmission over said bus of the second longword of each of said quadword write instructions to determine whether said cache memory has data stored at the destination address of each of said quadword write instructions so that a presence of said hit signal enables the writing of longwords of data from said first and second write buffers into said cache memory upon receipt from said bus of the second longword of each of said quadword write instructions.

10. The improvement as claimed in claim 9, wherein said first and second longwords each consist of four bytes, and the quadword consists of eight bytes.

* * * * *